United States Patent [19]

Luikart

[11] 4,221,057
[45] Sep. 9, 1980

[54] PRINTERS GAUGE

[76] Inventor: Walter W. Luikart, R.D. #3, Chapel Rd., New Castle, Pa. 16105

[21] Appl. No.: 50,661

[22] Filed: Jun. 21, 1979

[51] Int. Cl.³ .......................... B43L 7/06; G01B 3/02
[52] U.S. Cl. ...................................... 33/464; 33/494; 33/1 B
[58] Field of Search ................ 33/464, 473, 485, 494, 33/1 B, 1 C, 1 S

[56] References Cited

U.S. PATENT DOCUMENTS

| 1,623,117 | 4/1927 | Holland | 33/464 |
| 2,098,323 | 11/1937 | Wadsworth | 33/494 |
| 4,129,947 | 12/1978 | Brown | 33/1 B |

FOREIGN PATENT DOCUMENTS

| 536396 | 5/1970 | Fed. Rep. of Germany | 33/464 |
| 746231 | 3/1956 | United Kingdom | 33/464 |

*Primary Examiner*—Harry N. Haroian
*Attorney, Agent, or Firm*—Gamble, Verterano, Mojock & Green

[57] ABSTRACT

This invention relates to a device for counting typographical characters on a page of typed material. The disclosed invention includes a transparent first member which may be oriented along a line of typographical characters. A transparent second member is slidably mounted in a perpendicular relationship to the first member. There are provided on the first member a plurality of sets of parallel lines, each of said sets being disposed from one end of said transparent first member to another end, the lines in each of said sets being consecutively numbered. There are further provided on the first member a plurality of sets of discrete spaces also disposed from one end of the transparent first member to another end, the width of the spaces corresponding to a particular type size, and the width of said spaces being uniform within a particular set, such that said spaces are superimposable upon a line of typographical characters of a particular type face. The transparent second member is provided with a plurality of sets of parallel lines disposed substantially from one end of the second member to another end of the second member. The lines within a particular set are consecutively numbered and the distance between the lines of a particular set correspond to a particular line spacing of typographical characters.

8 Claims, 5 Drawing Figures

PRINTERS GAUGE

This invention relates to a printers gauge.

More specifically, a device is disclosed for counting typographical characters on a page of typed material. The disclosed invention includes a transparent first member which may be oriented along a line of typographical characters. A transparent second member is slidably mounted in a perpendicular relationship to said first member. There are provided on said first member a plurality of sets of parallel lines, each of said sets being consecutively numbered. There are further provided on said first member a plurality of sets of discrete spaces also disposed from one end of said first member to another end, the width of said spaces corresponding to a particular type size, and the width of said spaces being uniform within a particular type face. Said transparent second member is provided with a plurality of sets of parallel lines disposed substantially from one end of said second member to another end of said second member. The lines within a particular set are consecutively numbered and the distance between the lines of a particular set corresponds to a particular line spacing of typographical characters.

DESCRIPTION OF THE PRIOR ART

In general, as the material known as "copy" is being prepared for publication, it is submitted to the layout person in typewritten form. It is imperative that the person performing such a layout operation identify the size of the type being used and further obtain an accurate count of the number of typographical characters, including spaces, upon each page of typewritten material in that the size of the type and the number of characters will determine the area required within the publication within which the material will be placed. In obtaining a count, it is obvious that a physical count of each character and space may be taken upon each page of material, although this has the obvious disadvantage of being extremely cumbersome and time consuming. There are other methods used in the interest of time which produce faster counts yet sacrifice accuracy. One such method is to count the number of words on a page of typewritten material and multiply the number of words times five to obtain an approximate count of typographical characters, although this has the obvious drawback of assuming that each word has five letters and further ignores the spaces between the letters. Another method occasionally used involves measuring the number of characters per inch with a ruler and then multiplying the number of characters per inch thus obtained by the number of inches of typewritten material in each line. Again, this method is subject to inaccuracies both in measurement and in computing characters in segments of lines which may be a fraction of an inch in length. The invention to be described more fully hereinafter remedies these deficiencies and further includes many features not previously available therein.

It is therefore the object of this invention to provide a device which enables simultaneous counting of the number of typographical characters on printed material without the necessity of a physical count or the use of any approximations.

A further object of the invention is to provide a device which enables a person to quickly compensate for additional characters contained in larger lines of typewritten material and for lesser characters in shorter lines.

Yet another object is to provide a device which reduces the computation of typewritten characters in a page of printed material through an elementary multiplication and addition operation.

Still another object is to define a region of maximum area in which region the number of typographical characters may be quickly computed by an elementary computation thus minimizing the necessity to include within the computation lines of unusual length.

In attaining the foregoing objects, the invention provides a transparent first member which has three sets of ruled lines, each line within a particular set being a predetermined distance from another line, said lines being consecutively numbered according to a predetermined scheme. All three of said sets are parallel to one another and extend along the first member from one end to another end. The distance between each line in a particular set is uniform in respect of that set although the distance between lines varies among the sets. The first member also is provided with at least two sets of discrete spaces, which sets are parallel to each other and to the three sets of lines along the first member. The spaces in each set are of predetermined uniform width and the spaces of each set are consecutively numbered although the width of the spaces is not necessarily the same for each set, and each width is such that of the width of a particular type face or character, whereby a particular set of spaces is superimposable upon the typographical characters of a line of typed material and each typographical character is locatable within a described space.

A transparent second member is slidably mounted at one end to the first member such that the second member remains perpendicular to said first member.

The transparent second member is also provided with at least three sets of parallel lines disposed from a line where the projection of the edge of the first member intersects the second member, along said second member to another end of the second member. The distance between each line in a particular set is predetermined and uniform in respect of that set and the lines of each of said sets are consecutively numbered according to a predetermined scheme, although the distance between lines may vary among the sets. The predetermined distances between lines in each set is such that said distances correspond to single, double and triple spacing respectively of lines of typewritten material. The second member further has at least two sets of discrete spaces disposed in a perpendicular relationship to said sets of lines of second member and substantially parallel to the sets of spaces on the first member. Each of the spaces in said sets of spaces is of predetermined uniform width for each set and the widths of the spaces each set are substantially similar to the widths of the spaces of those sets of spaces on the first member. The second member has in addition, a hairline extending from one end to another end, which hairline is substantially parallel to said sets of lines on said second member and further is substantially perpendicular to the sets of spaces and lines on said first member and is located along an edge of the second member.

Other objects and advantages of the present invention will become apparent from the ensuing description of an illustrative embodiment thereof in the course of which reference is made to the accompanying drawings of which:

DESCRIPTION OF THE PREFERRED EMBODIMENT

Figure 1:
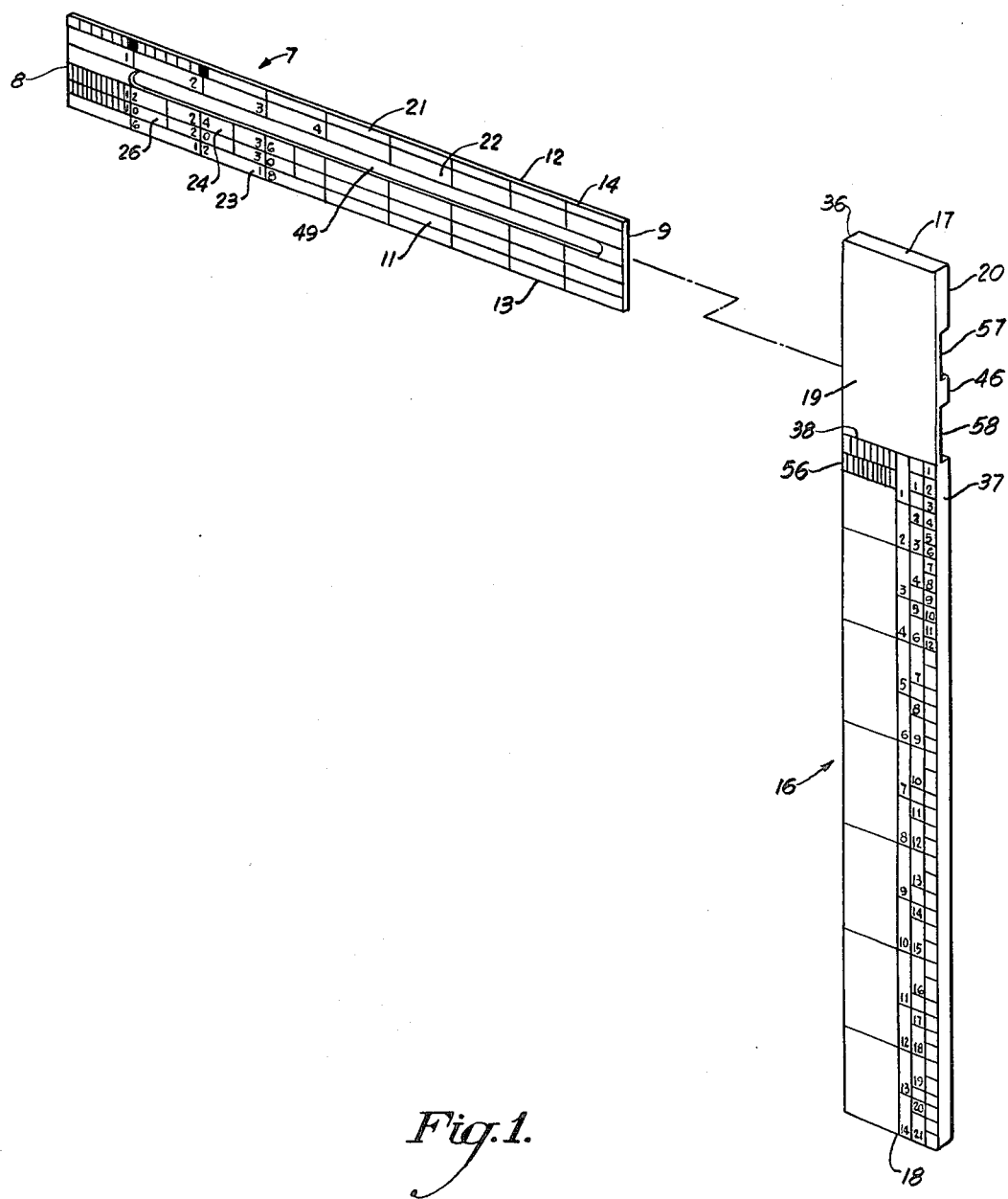
FIG. 1 illustrates in exploded view of three dimensional form the preferred embodiment of the invention.
Figure 2:
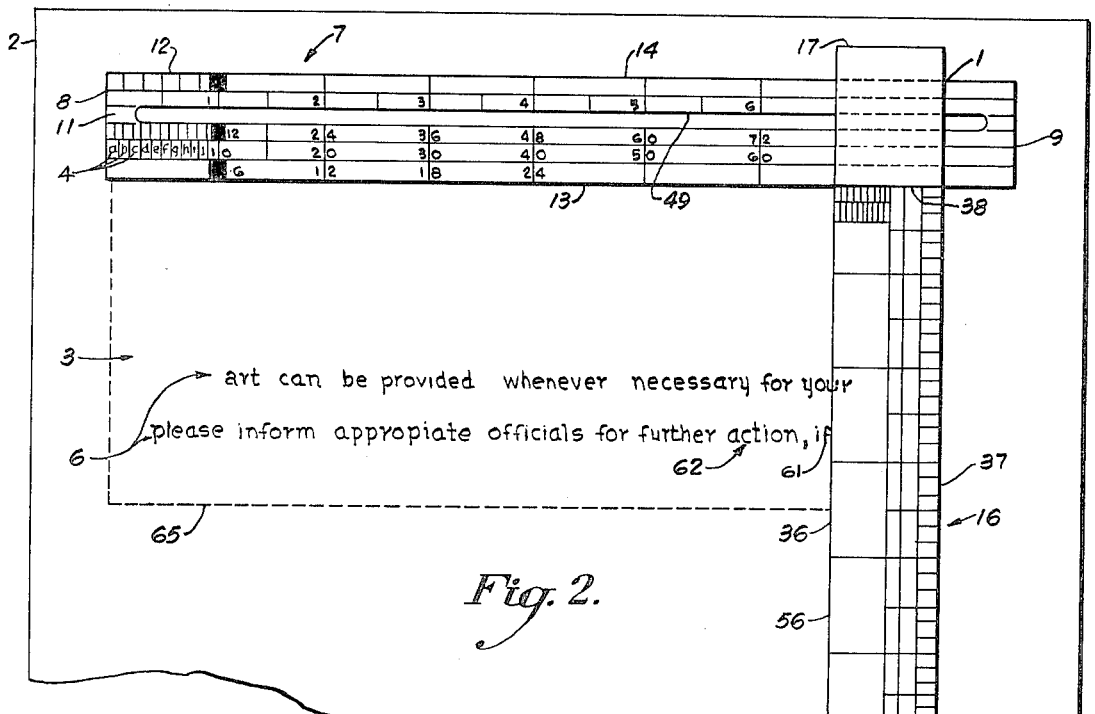
FIG. 2 illustrates the preferred embodiment of the invention in use counting typewritten characters on printed material.

A clearer understanding of the invention will be obtained if FIGS. 1 and 2 are studied in conjunction with the description which follows.

Referring first to FIG. 2, a transparent first member 7 is disposed over typed material 3. For purposes of illustration there can be seen typographical characters 4 through said first member 7. First member 7 has first end 8 and second end 9, and further has a first edge 13 and a second edge 12. First member 7 in addition has slot 49 disposed from first end 8 to second end 9.

Figure 2A:
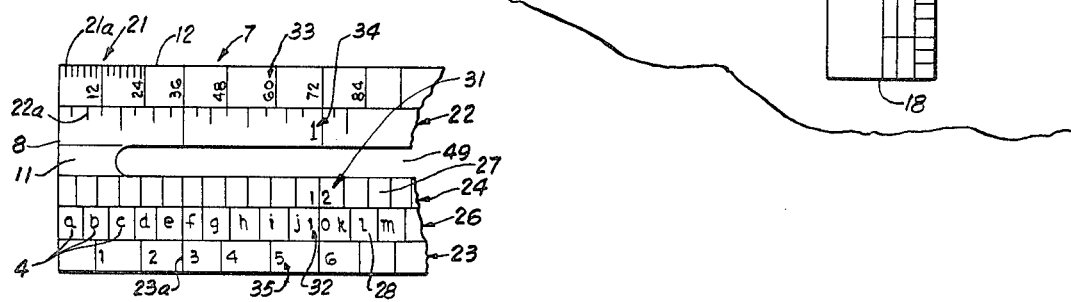
FIG. 2A is a detail view of a portion of a transparent first member and certain lines and spaces thereon.

Referring now to FIG. 2A, first member 7 further has first line set 21 which contains a plurality of discrete lines, a typical line in said first line set 21 being identified by reference numeral 21a. In the preferred embodiment, first line set 21 is shown as containing seventy-two of such discrete lines 21a per inch and each sixth discrete line is consecutively numbered as indicated generally by reference numeral 33. Similarly, first member 7 also has second line 22 and third line set 23 which likewise have discrete lines, a typical line in second line set 22 and third line set 23 being designated by reference numerals 22a and 23a respectively. In the preferred embodiment second line set 22 is shown containing sixteen of such discrete lines 22a per inch and each sixteenth discrete line is consecutively numbered as indicated generally by reference numeral 34. Third line set 23 contains six of said discrete lines 23a per inch, each of said discrete lines being consecutively numbered as indicated generally be reference numeral 35.

Still referring to FIG. 2A, there is also provided a first set of spaces indicated generally by numeral 24 and a second set of spaces indicated generally by numeral 26 which are similarly disposed on first member 7 from first end 8 a second end 9. Said first set of spaces 24 is comprised of distinct spaces, a typical space being indicated by numeral 27 which spaces 27 are discrete and of uniform width. In the preferred embodiment, the width of these individual spaces 27 of first set of spaces 24 is identical to the width of that type face known as elite, and the preferred embodiment further discloses 12 of such spaces per inch, or a total of 144 of such distinct spaces 27 integral with first member 7. Second set of spaces 26 is comprised of discrete spaces and these are also of uniform width, such width being that of a type face known as pica, a typical space of second set of spaces 26 being indicated by reference numeral 28. The preferred embodiment discloses 10 of such spaces 28 per inch, or a total of 120 of such discrete spaces 28 integral with first member 7. The said discrete spaces 27 of first set of spaces 24 are consecutively numbered as indicated generally by numeral 31, and the spaces 28 of second set of spaces 26 are consecutively numbered as indicated generally by reference numeral 32.

Referring again to FIGS. 1 and 2, second member 16 is transparent and has first end 17 and second end 18, and further has first edge 36 and second edge 37 and first side 19 and second side 20. Grooves 57 and 58 and protrusion 46 are located in proximity to first end 17 of second member 16, and these are disposed from first edge 36 to second edge 37 on second side 20 of second member 16. Protrusion 46 on second side 20 of second member 16 communicates with slot 49 on first member 7 and grooves 57 and 58 are of sufficient width so as to receive first edge 13 and second edge 14 of first member 7. In this configuration, first member 7 is able to slide relative to second member 16 and further, first member 7 and second member 16 remain in a substantially perpendicular relationship. First edge 13 of first member 7 may be seen through second member 16 because of the transparent quality of second member 16. Baseline 38 is disposed from first edge 36 to second edge 37 of second member 16, and is superimposed upon and parallel to first edge 13 of first member 7 where first edge 13 of first member 7 is visible through second member 16.

Figure 2B:
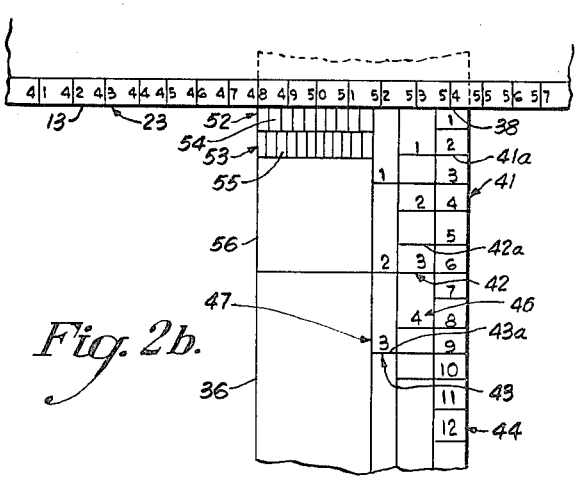
FIG. 2B is a detail view of a portion of a transparent first member and a transparent second member again showing lines and spaces thereon.

Referring now to FIG. 2B, second member 16 may be seen to have first line set 41, second line set 42 and third line set 43 which are substantially parallel to one another and extend from baseline 38 to second end 18 of first member 16. Still referring to FIG. 2B, first line set 41 contains discrete lines, a typical line in first line set 41 being identified on FIG. 2B by reference numeral 41a and first line set 41 is disclosed in the preferred embodiment as containing six of such discrete lines 41a per inch each of said discrete lines 41a having consecutive numbers associated therewith as indicated generally by reference numeral 44, the spacing between each of said discrete lines 41a corresponding to a single spacing arrangement of lines of typewritten characters. Second line set 42 also contains discrete lines, a typical line in second line set 42 being identified by reference numeral 42a and a second line set 42 is shown as containing three discrete lines 42a per inch each of said discrete lines 42a having consecutive numbers indicated generally by reference numeral 46 associated therewith, the spacing between each of said discrete lines 42a corresponding to a double spaced arrangement of lines of typewritten characters. Third line set 43 also contains discrete lines, a typical line in third line set 43 being identified by reference numeral 43a and third line set 43 is shown having two discrete lines 43a per inch each of said discrete lines 41a having consecutive numbers indicated generally by reference numeral 47 associated therewith, the spacing between each of said discrete lines 43a corresponding to a triple spaced arrangement of lines of typewritten characters.

Still referring to FIG. 2B, second member 16 has first set of spaces 52 and second set of spaces 53 which extend from first edge 36 to third line set 43, and are adjacent to and parallel with base line 38. First set of spaces 52 is comprised of discrete spaces a typical space in first set of spaces 52 being identified by reference numeral 54, said first set of spaces 52 containing ten of such discrete spaces 54 per inch, each of said spaces 54 being of uniform width such width being the width of that certain typographical face known as "pica".

Second set of spaces 53 is comprised of discrete spaces a typical space in second set of spaces 53 being identified by reference numeral 55, said second set of spaces 53 containing twelve of such discrete spaces 55 per inch, each of said spaces 55 being of uniform width such width being the width of that certain typographical face known as "elite". Hairline 56 extend from first end 17 to second end of second member 16 and is parallel to line sets 41, 42 and 43, hairline 56 being further located on second member 16 along first edge 36 of second member 16. A region 65 is shown on FIG. 2 which is formed on page 2 of typed material 3 and within such region 65 the number of typographical characters may be computed as more fully described hereinafter.

Figure 3:
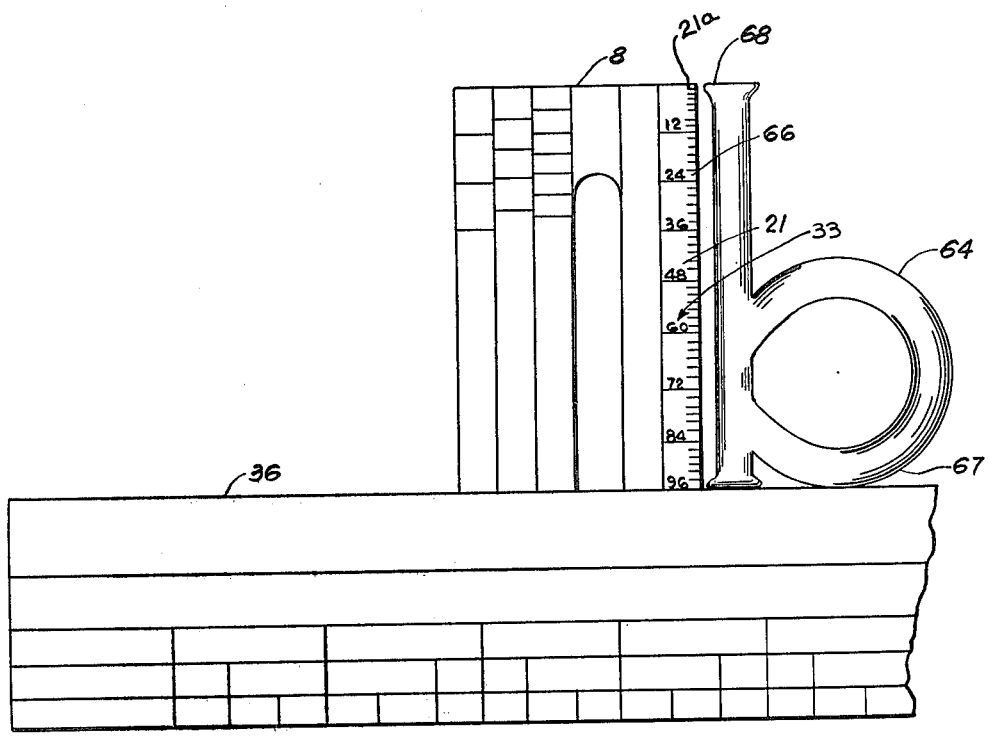
FIG. 3 is a detail view of a portion of a transparent first and second member being used to measure the size of a letter.

Finally, referring to FIG. 3, the disclosed invention is shown being used to determine the size of a letter 64 which letter is not of typographical size. It should be noted that for clarity and ease of depicting first member 7 and second member 16, that each and every discrete line and discrete space and the respective consecutive numbers associated therewith has not been shown on FIG. 1 or 2. Only those lines or spaces which are useful in illustrating the preferred embodiment of transparent first member 7 and its cooperation with transparent second member 16 are shown. As previously described, however, FIGS. 2A and 2B represent typical views along transparent first member 7 and transparent second member 16 respectively.

OPERATION

In using the within disclosed device to count typographical characters and lines thereof, first member 7 is placed over a line 6 of said typographical characters 4. The hereindescribed calculations are easiest when line 6 is chosen as the first line of the page. First set of spaces 24 and second set of spaces 26 are alternately placed over line 6 of said typographical characters 4 until the individual spaces 27 or 28 of either set of spaces 24 or 26 coincide with the spacing of the typographical characters 4.

Assuming that line 6 is not indented, by placing first end 8 of first member 7 over the beginning of line 6, a count of the number of such characters may be instantly seen by referring to the consecutive numbers 31 or 32 respectively associated with discrete spaces 27 or 28 of said first set of spaces 24 or said sound set of spaces 26. With first member 7 remaining in this position relative to said line 6 of typographical characters 4, second member 16 is moved to a position relative to a shortest line 62 of typographical characters, said shortest line 62 having a last typographical character 61 and necessarily having the fewest number of typographical characters therein such that hairline 56 is placed directly over said last typographical character 61 of said shortest line 62. At this point the spacing of the lines 6 of typographical characters is compared to first set of parallel lines 41, which corresponds to triple spacing of said lines 6 of typographical characters, second set of parallel lines 42 corresponding to double spacing of lines 6 typographical characters or third set of parallel lines 43 corresponding to single spacing of lines 6 of typographical characters. A count of such lines may be obtained merely by noting the consecutive numbers 44, 45 or 47 associated with sets of parallel lines 41, 42 or 43 respectively. The number of typographical characters on each of such lines 6 extending past hairline 56 are counted, by either a manual count thereof or by the use of either space set 52 or 53 on second member 16 an the count so obtained added to the number of typographical characters located within region 65. The number of typographical characters in said region 65 is computed by multiplying the number of characters is said shortest line 62 by the number of lines as previously determined yielding a total count of the number of typographical characters per page of printed material. In the vent that there is a short line at the end of a paragraph, not illustrated on the drawings herein, the number of characters therein may be readily obtained by moving first set of spaces 24 or second set of spaces 26 over said line and reading the appropriate consecutive numbers 31 or 32 associated therewith. Similarly, if a beginning line of a paragraph of typed material, not herein illustrated, is indented, examination of consecutive numbers 31 or 32 will yield the number of characters which must be subtracted from the count of characters within region 65 as abovedescribed to obtain the number of characters in said region 65.

Referring to FIG. 3, second member 16 may be placed along the bottom 67 of a character 64 such that first edge 36 of second member 16 just touches bottom 67 of character 64. By sliding first member 7 until first end 8 of first member 7 is adjacent to top 68 of character 64 the size of character 64 may be immediately read by examining first set of lines 21 which, as previously described, have consecutive numbers 33 corresponding to seventy-two lines per inch and in this embodiment corresponds to a standard printers gauge. Hence, the number 65 read on first set of parallel lines 21 is the size of the character 64.

Based upon the foregoing description, it may be seen that the present invention provides a device which defines a region of maximum area within the page of typewritten material and the number of typographical characters within this region is readily computed by simple multiplication. The characters remaining outside of this region are minimal in number and they are easily counted and added to a number of those characters contained within the defined region. The devise is able to accommodate different sized of typographical characters and further enables a rapid count of shorter lines occurring at the indentation of a paragraph or at an unusually short line at the end of a paragraph.

Although but one embodiment of the present invention has been illustrated and described, it would be apparent to those skilled in the art that various changes and modifications may be made therein without departing from the spirit of the invention and the invention is only limited as set forth in the accompanying claims.

I claim:
1. A gauge for measuring the size of typographical characters on printed material and for counting the number of such characters and the number of typographical lines comprising:
   (a) first transparent reading means having a first end and a second end, said first transparent reading means further having a plurality of sets of parallel lines integral therewith disposed from said first end to said second end, each of said sets of lines containing a predetermined number of lines, said first transparent reading means further having a plurality of sets of discrete spaces integral therewith, said spaces being defined by a plurality of lines perpendicular to said sets of parallel lines, and disposed from said first end to said second end, said spaces having predetermined widths; and
   (b) second transparent reading means having a first end and a second end and a first edge and a second edge, said second transparent reading means being slidably mounted at said first end of said second transparent reading means to said first transparent reading means such that said second transparent reading means is slidable relative to said first reading means and further that said first transparent reading means and said second transparent reading means remain substantially perpendicular, said second transparent reading means further having a plurality of sets of parallel lines integral therewith disposed from said first end to said second end of said second transparent reading means each of said sets of lines containing a predetermined number of lines, and further having a plurality of sets of discrete spaces integral therewith, said spaces being defined by a plurality of lines perpendicular to said sets of parallel lines on said first transparent reading means, said spaces having predetermined widths, and being disposed from said first edge of said second transparent reading means to said sets of parallel lines, whereby said typographical characters on said printed material are locatable within at least one set of said plurality of sets of said discrete spaces of said first transparent reading means and said second transparent reading means and further said lines of said typographical characters are locatable in position relative to at least one of said sets of parallel lines on said second transparent reading means.

2. The gauge of claim 1 wherein a first set of parallel lines integral with said first transparent reading means contains a predetermined number of lines such that each set contains a lesser number in a particular space set of lines than a preceeding set, and wherein the widths of said spaces on said first transparent reading means are equal to the widths of said spaces in a particular space set on said second transparent reading means.

3. The gauge of claim 2 wherein a first set of parallel lines integral with said second reading means contains a predetermined number of lines and each of said remaining sets of lines contain a predetermined number of lines such that each set contains a lesser number of lines than a preceeding set.

4. A gauge for measuring the size of typographical characters on printed material and for counting the number of such characters comprising:
  (a) a transparent first member having a first end and a second end, and having a first edge and a second edge, said first member further having at least three sets of parallel lines disposed from said first end to said second end, the first of said sets containing a predetermined even number of lines, and the second of said sets containing a predetermined lesser even number of lines and each of said remaining sets containing a predetermined lesser number of lines than a preceeding set, said transparent first member further having at least two sets of discrete spaces, said spaces being defined by a plurality of lines perpendicular to said sets of parallel lines, said spaces in each of said sets having predetermined uniform widths and being disposed from said first end of said transparent first member to said second end of said first member; and
  (b) a transparent second member having a first end and a second end and a first edge and a second edge, and a first side and a second side, said transparent second member being slidably mounted at its first end to said transparent first member such that said first and second member remain substantially perpendicular, and further such that there exists a line on said first side of said transparent second member, said line being the projection of said first edge of said transparent first member onto said first side of said transparent second member, said line further being disposed from said first edge of said transparent second member to said second edge, said transparent second member further having at least three sets of parallel lines disposed from said line on said second transparent member to said second end of said transparent second member, a first of said sets of parallel lines containing a predetermined even number of lines, a second of said sets of parallel lines containing a predetermined lesser number of lines and the remainder of said sets of parallel lines containing a predetermined number of lines such that each set of lines contains a lesser number of lines than a preceeding set, said transparent second member further having at least two sets of discrete spaces, said spaces being defined by a plurality of lines perpendicular to said sets of parallel lines on said transparent first member, said spaces in each of said sets having predetermined uniform widths and being disposed from said first edge of said transparent second member to said set of parallel lines on said transparent second member, said sets of spaces further being located in proximity to said first edge of said transparent first member, said transparent second member further having a hairline extending from said first end to said second end and located in a position such that said hairline is superimposed upon said first edge of said transparent second member.

5. The gauge of claim 4 wherein said first set of lines on said transparent first member contains seventy-two lines per inch or a multiple thereof, and further have consecutive numbers associated therewith said second set of lines on said transparent first member contains sixteen lines per inch, or a multiple thereof, and further have consecutive numbers associated therewith and said third set of lines on said transparent first member contains six lines per inch, or a multiple thereof, and further have consecutive numbers associated therewith.

6. The gauge of claim 5 wherein said first set of parallel lines of said transparent second member contains six lines per inch, and further have consecutive numbers associated therewith, said second set of parallel lines on said transparent second member contains three lines per inch, and further have consecutive numbers associated therewith, and said third set of parallel lines on said transparent second member contains two lines per inch and further have consecutive numbers associated therewith.

7. The gauge of claim 6 wherein the spaces of each of said sets of spaces on said transparent first and second members have predetermined widths equal to the width of typographical characters, said spaces of each of said sets of spaces having consecutive numbers associated therewith.

8. The gauge of claim 7 wherein the width of each space in one set of said spaces is equal to the width of those typographical characters known as pica and the width of each space in another set of said spaces is equal to the width of those typographical characters known as elite, whereby said typographical characters are located within at least one set of discrete spaces on said transparent first and second members and further, whereby the lines of said typographical characters align with at least one set of parallel lines on said transparent second member.

* * * * *